United States Patent [19]

Roehrich et al.

[11] Patent Number: 5,287,705
[45] Date of Patent: Feb. 22, 1994

[54] AIR CONDITIONING AND REFRIGERATION SYSTEMS UTILIZING A CRYOGEN

[75] Inventors: Roland L. Roehrich, Pittsburgh, Pa.; Herman H. Viegas, Bloomington, Minn.

[73] Assignee: Thermo King Corporation, Minneapolis, Minn.

[21] Appl. No.: 17,905

[22] Filed: Feb. 16, 1993

[51] Int. Cl.$^5$ .............................................. F17C 9/04
[52] U.S. Cl. ..................................... 62/50.3; 62/217; 62/223
[58] Field of Search .................... 62/217, 223, 50.3

[56] References Cited

U.S. PATENT DOCUMENTS

| | | | |
|---|---|---|---|
| 3,070,974 | 1/1963 | Greenwald | 62/223 X |
| 3,802,212 | 4/1974 | Martin et al. | 62/80 X |
| 4,045,972 | 9/1977 | Tyree, Jr. | 62/217 X |
| 4,100,759 | 7/1978 | Tyree, Jr. | 62/332 X |
| 4,186,562 | 2/1980 | Tyree, Jr. | 62/239 X |
| 4,498,306 | 2/1985 | Tyree, Jr. | 62/165 X |
| 4,856,291 | 8/1989 | Takahashi | 62/217 |
| 4,899,549 | 2/1990 | Berge et al. | 62/217 X |
| 5,040,374 | 8/1991 | Micheau | 62/52.1 |
| 5,069,039 | 12/1991 | Martin | 62/50.3 |
| 5,090,209 | 2/1992 | Martin | 62/50.3 |

*Primary Examiner*—William E. Wayner
*Attorney, Agent, or Firm*—M. J. Moran

[57] ABSTRACT

A refrigeration system which controls the temperature of a conditioned space to a predetermined temperature range adjacent to a selected set point temperature SP via a cooling cycle which includes evaporation a cryogen, such as $CO_2$ or $N_2$, in a heat exchanger. In an apparatus embodiment, a controller determines a desired evaporation vapor pressure value EPX of the cryogen as a function of the selected set point temperature SP, and then controls the evaporation pressure EP in the heat exchanger means as a function of the determined desired evaporating vapor pressure value. The controller further determines a desired superheat value SHX of the cryogen exiting the heat exchanger means as a function of the selected set point temperature SP, and controls the mass flow rate of liquid cryogen evaporating in the heat exchanger as a function of the determined desired superheat value. A method embodiment includes the steps of providing a desired evaporation vapor pressure value EPX of the cryogen as a function of the selected set point temperature SP, controlling the evaporation pressure in the heat exchanger means as a function of the desired evaporation vapor pressure value, providing a desired superheat value SHX of the cryogen exiting the heat exchanger means as a function of the selected set point temperature SP, and controlling the mass flow rate of liquid cryogen from the cryogenic cooling means to the heat exchanger means as a function of the desired superheat value.

18 Claims, 4 Drawing Sheets

| ROM LOOK-UP TABLE ||||
|---|---|---|---|
| SP °F (°C) | SHX °F (°C) | $CO_2$ EVAPORATION CHARACTERISTICS ||
| | | EPX (PSIA) | ETX °F (°C) |
| −20(−28.9) | 10(5.55) | 171 | −32(−35.6) |
| −10(−23.3) | 10(5.55) | 207 | −22(−30.0) |
| 0(−17.8) | 10(5.55) | 236 | −15(−26.1) |
| 15(−9.4) | 12(6.66) | 300 | 0(−17.8) |
| 35(1.67) | 24(13.3) | 300 | 0(−17.8) |
| 50(10) | 40(22.2) | 300 | 0(−17.8) |

FIG. 5

AIR CONDITIONING AND REFRIGERATION SYSTEMS UTILIZING A CRYOGEN

TECHNICAL FIELD

The invention relates in general to air conditioning and refrigeration systems, and more specifically to stationary and transport air conditioning and refrigeration systems which utilize a cryogen.

BACKGROUND ART

Transport refrigeration systems condition the air of a refrigerated space of a vehicle, hereinafter called the "conditioned space", such as a straight truck, the trailer of a tractor-trailer combination, a refrigerated container, and the like, with the air of the conditioned space being controlled to a narrow temperature range around or adjacent to a predetermined set point temperature. Such systems conventionally utilize a chlorofluorocarbon (CFC) refrigerant in a mechanical refrigeration cycle. The mechanical refrigeration cycle requires a refrigerant compressor driven by a prime mover, which often includes a dedicated internal combustion engine, such as a diesel engine. Because of the suspected depleting effect of CFC's on stratospheric ozone ($O_3$), and the detrimental effects of diesel emissions, practical alternatives to the use of CFC's are being sought.

The use of a cryogen, ie., a gas which has been compressed to a very cold liquid state, such as carbon dioxide ($CO_2$) and nitrogen ($N_2$), in a transport refrigeration system is particularly attractive because, in addition to eliminating the need for a CFC, it also eliminates the need to transport a compressor and associated prime mover.

It would be desirable, and it is an object of the present invention, to provide new and improved cryogenic based air conditioning and refrigeration systems, suitable for both transport and stationary applications, which more effectively and efficiently utilize the cryogen, for improved temperature control of a conditioned space, as well as for lower cost operation. The term "refrigeration system" will be hereinafter used to generically cover both air conditioning and refrigeration applications, transport and stationary.

Cryogens in a liquid state may be delivered to the refrigeration system at much colder temperatures than temperatures associated with fresh loads, such as lettuce, for example. Thus, it would be desirable, and it is another object of the invention, to provide a refrigeration system utilizing a cryogen which effectively conditions a space containing a fresh load, while minimizing the chance for spot freezing, without compromising the ability of the system to adequately condition a frozen load.

SUMMARY OF THE INVENTION

Briefly, the invention includes a method of operating a refrigeration system having cryogenic cooling means in a liquid state and heat exchanger means, for controlling the temperature of a conditioned space to a predetermined temperature range adjacent to a selected set point temperature SP via at least a cooling cycle. The cooling cycle includes the steps of providing a desired evaporation vapor pressure value EPX of the cryogen as a function of the selected set point temperature SP, controlling the evaporation pressure in the heat exchanger means as a function of the desired evaporation vapor pressure value, providing a desired superheat value SHX of the cryogen exiting the heat exchanger means as a function of the selected set point temperature SP, and controlling the mass flow rate of liquid cryogen from the cryogenic cooling means to the heat exchanger means as a function of the desired superheat value.

In a preferred embodiment the step of controlling the evaporation pressure in the heat exchanger means as a function of the desired evaporation pressure value includes the steps of determining the actual evaporation vapor pressure EP of the cryogen, providing a pressure difference value $\Delta P$ responsive to the difference between the actual and desired evaporation pressures, and controlling the evaporation pressure in the heat exchanger means as a function of the pressure difference value.

Also, in a preferred embodiment, the step of controlling the mass flow rate of liquid cryogen from the cryogenic cooling means to the heat exchanger means as a function of the desired superheat value includes the steps of determining the actual superheat SH in the cryogen exiting the heat exchanger means, providing a superheat difference value $\Delta S$ responsive to the difference between the actual and desired superheat values, and controlling the mass flow rate of liquid cryogen from the cryogenic cooling means to the heat exchanger means as a function of the superheat difference value.

The invention further includes a refrigeration system having cryogenic cooling means in a liquid state and heat exchanger means, with the refrigeration system controlling the temperature of a conditioned space to a predetermined temperature range adjacent to a selected set point temperature SP via at least a cooling cycle. Controller means determines a desired evaporation vapor pressure value EPX of the cryogen as a function of the selected set point temperature SP, and the evaporation pressure EP in the heat exchanger means is then controlled as a function of the desired evaporation vapor pressure value. The controller means also includes means for determining a desired superheat value SHX of the cryogen exiting the heat exchanger means as a function of the selected set point temperature SP, and the mass flow rate of liquid cryogen from the cryogenic cooling means to the heat exchanger means is then controlled as a function of the desired superheat value.

In a preferred embodiment the controller means which controls the evaporation pressure EP in the heat exchanger means as a function of the desired evaporation pressure value EPX includes means determining the actual evaporation vapor pressure EP of the cryogen, means providing a pressure difference value $\Delta P$ responsive to the difference between the actual and desired evaporation pressures, and means controlling the evaporation pressure in the heat exchanger means as a function of the pressure difference value.

In another preferred embodiment, the controller means which controls the mass flow rate of liquid cryogen from the cryogenic cooling means to the heat exchanger means as a function of the desired superheat value SHX includes means determining the actual superheat SH in the cryogen exiting the heat exchanger means, means providing a superheat difference value $\Delta S$ responsive to the difference between the actual and desired superheat values, and means controlling the mass flow rate of liquid cryogen from the cryogenic cooling means to the heat exchanger means as a function of the superheat difference value.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

As used in the following description and claims, the term "conditioned space" includes any space to be temperature and/or humidity controlled, including stationary and transport applications for the preservation of foods and other perishables, maintenance of a proper atmosphere for the shipment of industrial products, space conditioning for human comfort, and the like. The term "refrigeration system" is used to generically cover both air conditioning systems for human comfort, and refrigeration systems for preservation of perishables and shipment of industrial products. Also, when it is stated that the temperature of a conditioned space is controlled to a selected set point temperature, it is to be understood that the temperature of the conditioned space is controlled to a predetermined temperature range adjacent to the selected set point temperature.

Figure 1:
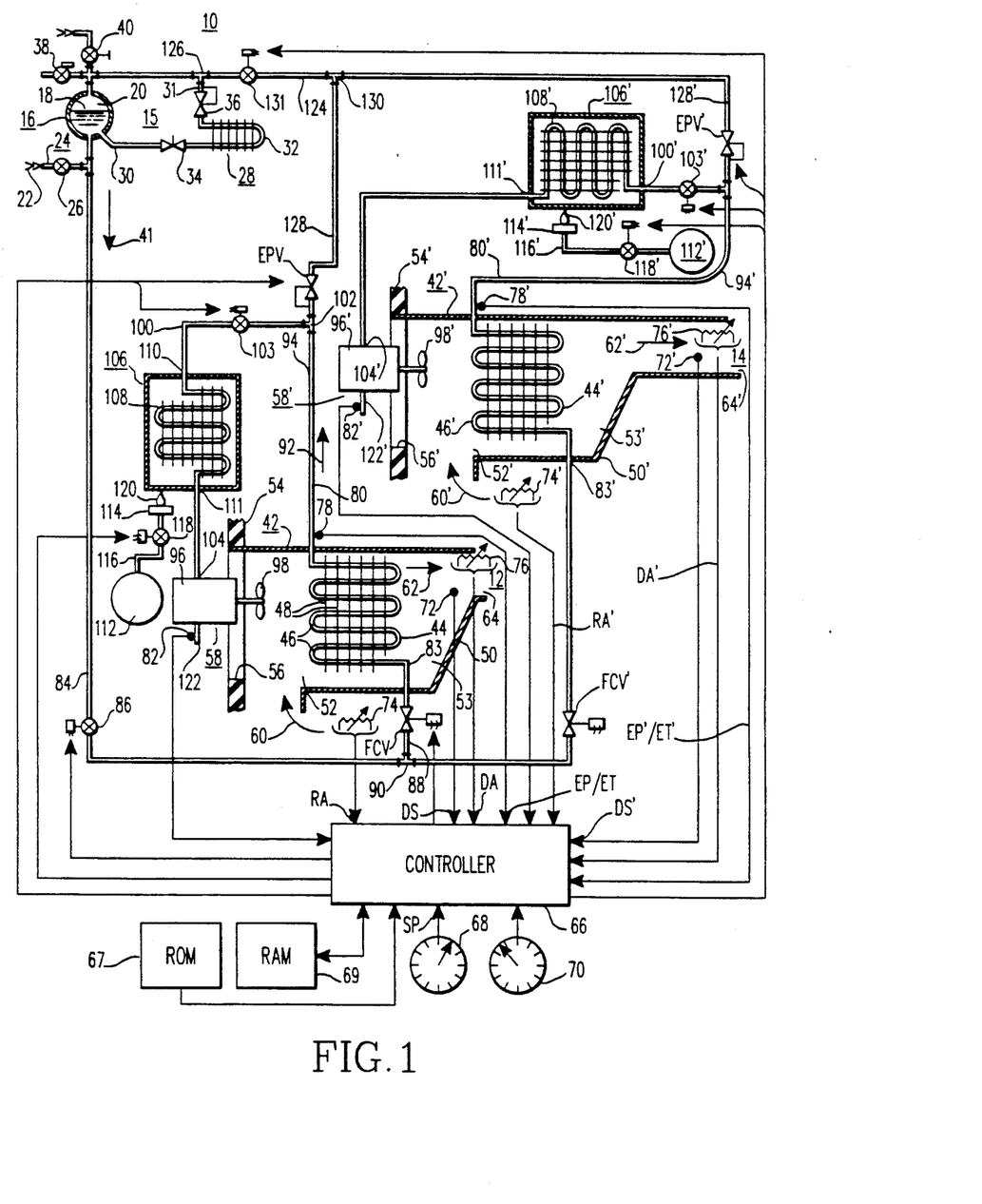
FIG. 1 is a detailed diagrammatic representation of a refrigeration system constructed according to the teachings of the invention.

Referring now to the drawings, and to FIG. 1 in particular, there is shown a detailed diagrammatic representation of an exemplary implementation of a refrigeration system 10 constructed according to the teachings of the invention. Refrigeration system 10 is suitable for use with any conditioned space, and particularly well suited for use on vehicles, such as straight trucks, tractor-trailer combinations, containers, and the like, with the word "vehicle" being used to generically refer to the various transport vehicles which utilize refrigeration systems.

Refrigeration system 10 may be used with a single conditioned space 12 to be controlled to a pre-selected set point temperature, and also when conditioned space 12 is compartmentalized or divided into two or more separate conditioned spaces to be individually controlled to selected set point temperatures, which may be different in different conditioned spaces, or the same, as dictated by the specific types of loads contained therein. For purposes of example, a second conditioned space 14 is illustrated in FIG. 1. The components of refrigeration system 10 associated with conditioned spaces 12 and 14 may be of like construction and of like operation within the system, and thus only the components, and operation thereof, associated with conditioned space 12 will be described in detail. Like refrigeration components associated with conditioned spaces 12 and 14 are identified with like reference numbers except for the addition of a prime mark relative to the identification of components associated with conditioned space 14.

Refrigeration system 10 includes cryogenic cooling means 15. Cryogenic cooling means 15 includes an on-board thermally insulated, or vacuum insulated, supply vessel 16 containing a suitable cryogen, such as liquid nitrogen ($N_2$), or liquid carbon dioxide ($CO_2$), for example, indicated at 18. Vessel 16 also contains cryogen 20 in vapor form, above the liquid level. Vessel 16 may be filled with the selected cryogen, for example, by connecting suitable ground support apparatus, which term includes trucks, shown generally at 22, to a supply line or conduit 24 which includes a valve 26.

Vapor pressure in vessel 16 is maintained above a predetermined value by a pressure building and regulating arrangement 28 in which conduits 30 and 31 respectively connect a cryogen vaporizing coil 32 to lower and upper points of supply vessel 16. Conduit 30, which connects a low point of vessel 16 to vaporizing coil 32 includes a valve 34 which permits flow of liquid cryogen as the pressure in vessel 16 drops. Vaporizing coil 32 may be directly exposed to ambient temperatures; or, vaporizing coil 32 may be disposed within a housing and selectively heated by the ambient, and/or via by-product heat generated during the operation of refrigeration system 10, as desired. Conduit 31, which connects vaporizing coil 32 to a high point of supply vessel 16, includes a pressure regulating valve 36. A pressure reading safety valve 38 is provided in conduit 31 at a point where the vapor pressure in vessel 16 may be directly sensed. A venting valve 40 is also provided to facilitate the filling process. Valve 40 may be connected to the ground support apparatus 22 during filling, if desired.

Valve 34 opens when the vapor pressure in vessel 16 falls to a predetermined value. The predetermined value is selected to enable liquid cryogen 18 to flow into the pressure building arrangement 28, as well as into a first fluid flow path, indicated by arrow 41. When the cryogen is $CO_2$ the predetermined value is selected to be above the triple point of $CO_2$, ie., 75.13 psia, and in this instance arrangement 28 regulates the vapor pressure in vessel 16 to at least about 80 psia, for example.

As hereinbefore stated, valve 34 admits liquid cryogen into vaporizing coil 32, and vaporizing coil 32, which is exposed to vaporizing temperatures, warms and vaporises the liquid cryogen. As described in application Ser. No. 07/982,313 filed Nov. 27, 1993, vaporizing coil 32 may be exposed to higher temperatures than ambient, especially during low ambient temperature conditions, by utilizing gases produced by products of combustion of a fuel used during heating and defrost cycles; and/or also from a fuel used to produce higher fan horsepower; and/or, by utilizing warm cryogen after it has been fully utilized in other refrigeration system functions.

Using $CO_2$ as an example of a suitable cryogen, vessel 16 may be filled with $CO_2$ at an "as delivered" initial pressure of about 300 psia and a corresponding saturation temperature of about 0° F. ($-17.8°$ C.), for example. Of course, other pressures and temperatures may be used.

Refrigeration system 10 includes heat exchanger means 42. Heat exchanger means 42 includes one or more heat exchangers, such as heat exchanger 44, with each heat exchanger having one or more fluid flow paths, such as those conventionally formed of a plurality of interconnected metallic hair pin tubes 46 which may be in thermal contact with a plurality of closely spaced metallic heat transfer fins 48 which extend from tube to tube.

Heat exchanger means 42 includes a housing 50 which defines return air and discharge air plenums 52 and 53, respectively, is mounted on a wall 54 associated with conditioned space 12, adjacent to and aligned with an opening 56 in wall 54. Air mover means 58 draws air from conditioned space 12 into return air plenum 52, with this "return air" being indicated by arrow 60. Air mover means 58 forces the return air 60 through, and in heat exchange relation with, heat exchanger 44, with this conditioned discharge air being indicated by arrow 62. Discharge air 62 enters conditioned space 12 via the discharge air plenum 53 which directs the conditioned air through an outlet opening 64 in housing 50. An optional defrost damper (not shown) may be disposed in discharge plenum 53 to controllably open and close the outlet opening 64, with the closed position preventing air from being discharged into conditioned space 12 during a defrost cycle. If air mover means 58 is stopped during a defrost cycle, a defrost damper would not be required.

An electrical control module or controller 66 is provided to control the operation of refrigeration system 10 according to the teachings of the invention. Controller 66 preferably includes a microprocessor having a read-only-memory (ROM) 67 and a random-access-memory (RAM) 69. Controller 66 includes logic in the form a stored program, to be hereinafter described, which determines when conditioned space 12 requires a cooling cycle, or a heating cycle, to hold the temperature of conditioned space 12 to a predetermined set point temperature. The set point temperature for conditioned space 12 is selected via a set point temperature selector 68, and the set point temperature for conditioned space 14 is selected via a set point temperature selector 70. Controller 66 also determines when a defrost cycle is required to remove water frost and ice which may build up on heat exchanger 44. The need for a defrost cycle may be detected by a defrost sensor 72 which provides a signal DS. Defrost sensor 72 may sense the discharge air flow, detecting diminished air flow due to ice build-up on heat exchanger 44, thus indicating when a defrost cycle is necessary. Defrost sensor 72 may also be of the type which is disposed in contact with an external surface of heat exchanger 44, to sense the surface temperature of heat exchanger 44 and thus ice build-up. Additional inputs to controller 66 include an input RA from a return air temperature sensor 74, an input DA from a discharge air temperature sensor 76, an input EP/ET from a pressure and temperature sensor 78 disposed at the output end 80 of heat exchanger 44 to detect the vapor pressure and temperature of the cryogen exiting heat exchanger 44, an ambient air temperature sensor (not shown), and a temperature sensor 82 associated with the temperature of cryogen exiting air mover means 58.

Cryogenic cooling means 15 is connected to the input side or header 83 of heat exchanger 44 via the hereinbefore mentioned first fluid flow path 41. The first fluid flow path 41 includes a conduit 84 having an on/off valve 86, a conduit 88 which taps conduit 84 via a tee 90, and a flow control valve FCV for incrementally controlling the mass flow rate of liquid cryogen 18 into heat exchanger 44.

Return air 60 from conditioned space 12 is moved over and through heat exchanger 44 by the air mover means 58, removing heat from the return air 60 during a cooling cycle, and discharging conditioned air 62 back into conditioned space 12. Heat removed from return air 60 vaporizes the cryogen flowing through heat exchanger 44, and may superheat it, ie., heat the vaporized cryogen above the evaporation or saturation temperature thereof, with the evaporation temperature being responsive to the vapor pressure.

The first fluid flow path 41 directs liquid cryogen 18 to heat exchanger 44. A second fluid flow path, indicated by arrow 92, directs cryogen vaporized in heat exchanger 44 during a cooling cycle to further functions in refrigeration system 10. The second fluid flow path 92 includes a conduit 94.

After exiting heat exchanger 44 via conduit 94, the vaporized cryogen may be discharged to the atmosphere, collected and compressed, or further actively utilized by refrigeration system 10. In a preferred embodiment of the invention, which embodiment is especially suitable for transport refrigeration applications, the vaporized cryogen is utilized to power the air mover means 58. Air mover means 58 includes a vapor driven motor or vapor driven turbine, hereinafter generically referred to as vapor motor 96, which drives a blower or fan 98. As disclosed in application Ser. No. 07/982,364 filed Nov. 27, 1992, independent control may be incorporated over the blower or fan 98, enabling blower or fan 98 to circulate air throughout conditioned space 12 during cooling and heating cycles, and also during a null cycle which may be initiated when refrigeration system 10 does not require heating or cooling to maintain the selected set point temperature in conditioned space 14. Thus, during a cooling cycle, instead of collecting or discharging vaporized cryogen to the atmosphere, the vaporized cryogen is directed to a conduit 100 via conduit 94 and a tee 102. Conduit 100 is connected to an input side 104 of vapor motor 96 via a valve 103. Vapor motor 96 may be the sole power source for implementing air circulation between conditioned space 12 and heat exchanger 44; or, it may supplement fans or blowers driven by a battery, alternator, generator, internal combustion engine, and the like. In stationary applications of the invention, electric motors connected to electrical mains may be used instead of, or in conjunction with, vapor motors. Also in stationary applications, the expended cryogen may be more easily collected and re-compressed.

In line with the teachings of the hereinbefore mentioned application Ser. No. 07/982,364 conduit 100 preferably includes heating means 106 which includes a heat exchanger 108 having input and output ends 110 and 111 connected to conduit 100. Heating means 106 further includes a supply 112 of combustible fuel, such as propane, liquid natural gas, diesel fuel, and the like, a burner 114, and a conduit 116 connected between fuel supply 112 and burner 114 via a valve 118. In stationary applications, heat may be obtained from other suitable sources, including electrical sources, hot liquids, steam, waste gases, and the like. Thus, when the energy of the vaporized cryogen entering vapor motor 96 is not sufficient to provide the desired air flow in conditioned space 14, which may be detected by speed or RPM sensor means (not shown) associated with vapor motor 96, for example, controller 66 opens valve 118 and ignites the fuel, to provide a flame, indicated at 120. The warmed cryogen exits vapor motor 96 via a conduit 122 which may be a collection, or a discharge point, or the cryogen may further be utilized. Temperature detector 82 indicates to controller 66 whether or not the cryogen may be further efficiently utilized, and the specific mode of such further utilization, such as by directing the cryogen through another heat exchanger in heat exchanger means 42, or through another set of tubes in heat exchanger 44, via suitable conduits and valving; or, in heat exchange relation with a cryogen vaporizing coil, such as the vaporizing coil 32.

The pressure of the vaporized cryogen in conductor 94 is adjustably and incrementally controlled according to the teachings of the invention, as well as being maintained above a predetermined minimum pressure value during a cooling cycle, such as 80 psia when the cryogen is $CO_2$, by using the vapor pressure in vessel 16 to provide a vapor pressure in conduit 94 which is selected by controller 66. A conduit 124 taps conduit 31 via a tee 126, and a conduit 128 taps conduit 124 via a tee 130. Conduit 128 includes an incrementally adjustable pressure regulating valve EPV which regulates the vapor pressure in conduit 94, and thus the evaporation pressure in heat exchanger 44, as will be hereinafter explained. Conduit 124 includes an on/off valve 131 which is closed when refrigeration system 10 is shut down, and otherwise open.

When refrigeration system 10 is shut down, it is desirable to provide shut-down isolation in the cryogen flow paths through the various heat exchangers by closing a valve on the input side of heat exchanger 44, e.g., valve 86, and by closing valves 103 and 131 on the output side of heat exchanger 44.

When conditioned space 12 requires a heating cycle to achieve and/or hold the set point temperature SP selected by set point selector 68, or a heating cycle to defrost heat exchanger 44, any of a plurality of different heat cycle providing arrangements shown and described in application Ser. Nos. 07/982,333; 07/982,336; 07/982,329; 07/982,364; 07/982,543; 07/982,548; 07/982,370 and 07/982,368; all filed Nov. 27, 1992, may be used.

A defrost cycle is similar to a heating cycle, except air heated by heat exchanger 44 may be prevented from entering conditioned space 12 during a defrost cycle by closing a defrost damper (not shown), or by stopping air mover means 58. A defrost cycle may be initiated by sensor 72, which provides a signal DS to controller 66; by a timer (not shown); by a manual switch (not shown); by a temperature sensor (not shown) connected to an external surface of heat exchanger 44; by pressure and temperature sensor 78 which detects the exiting pressure and temperature of the cryogen vaporized in heat exchanger 44; by a programmed algorithm; and the like. Preventing warm air from entering conditioned space 12 during a defrost cycle may be accomplished by shutting off the supply of cryogen to vapor motor 96, as hereinbefore mentioned, conserving cryogen during a defrost cycle and eliminating the need for a defrost damper. When a defrost damper is provided, it may be desirable to close it and keep vapor motor 96 operating during defrost, as this arrangement may have the advantage of shortening defrost time.

Figure 2A:
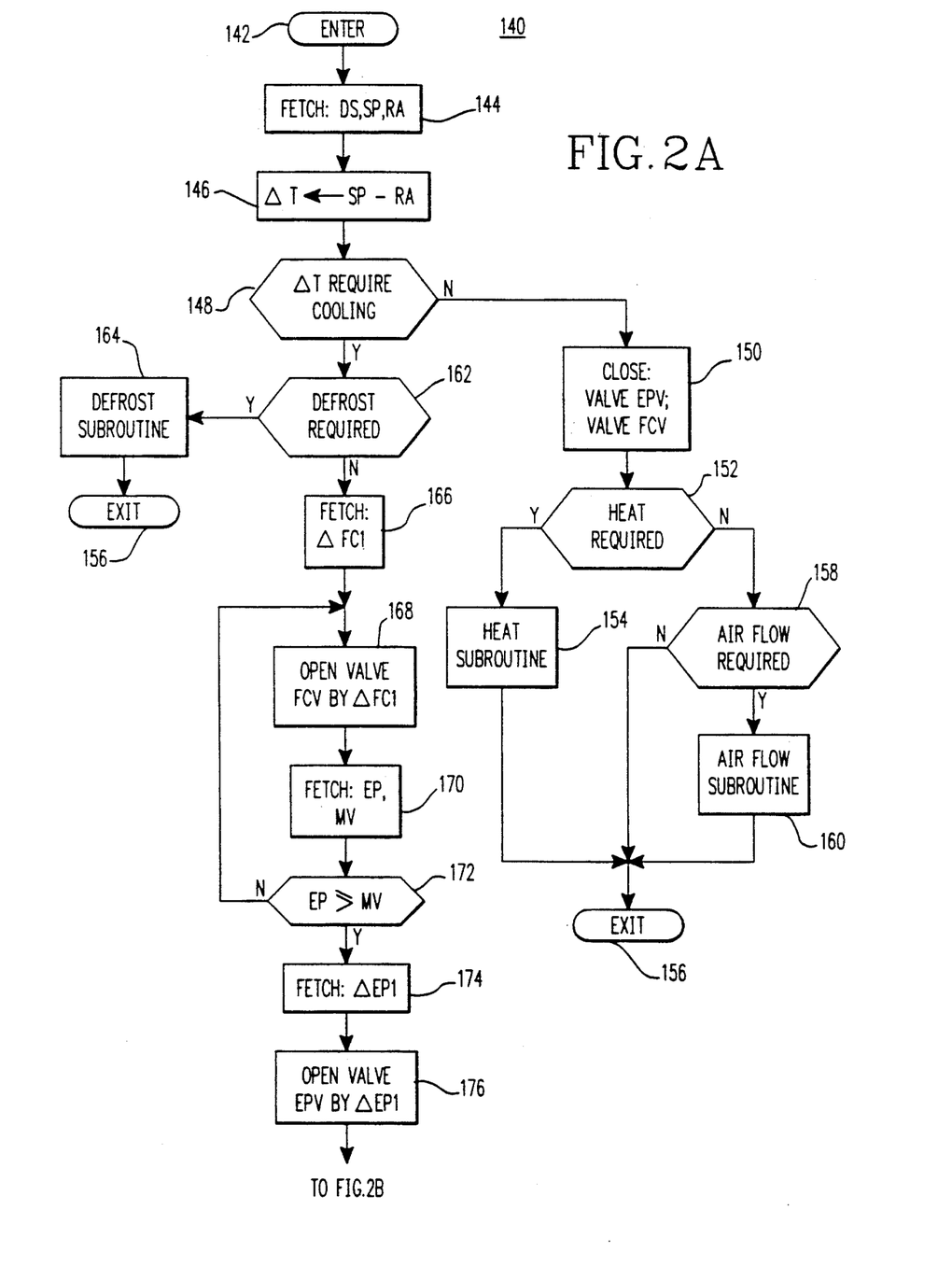
FIGS. 2A and 2B illustrate a flow diagram of a program utilized by a controller shown in FIG. 1, with the program implementing new and improved refrigeration system operating methods according to the teachings of the invention.
Figure 2B:
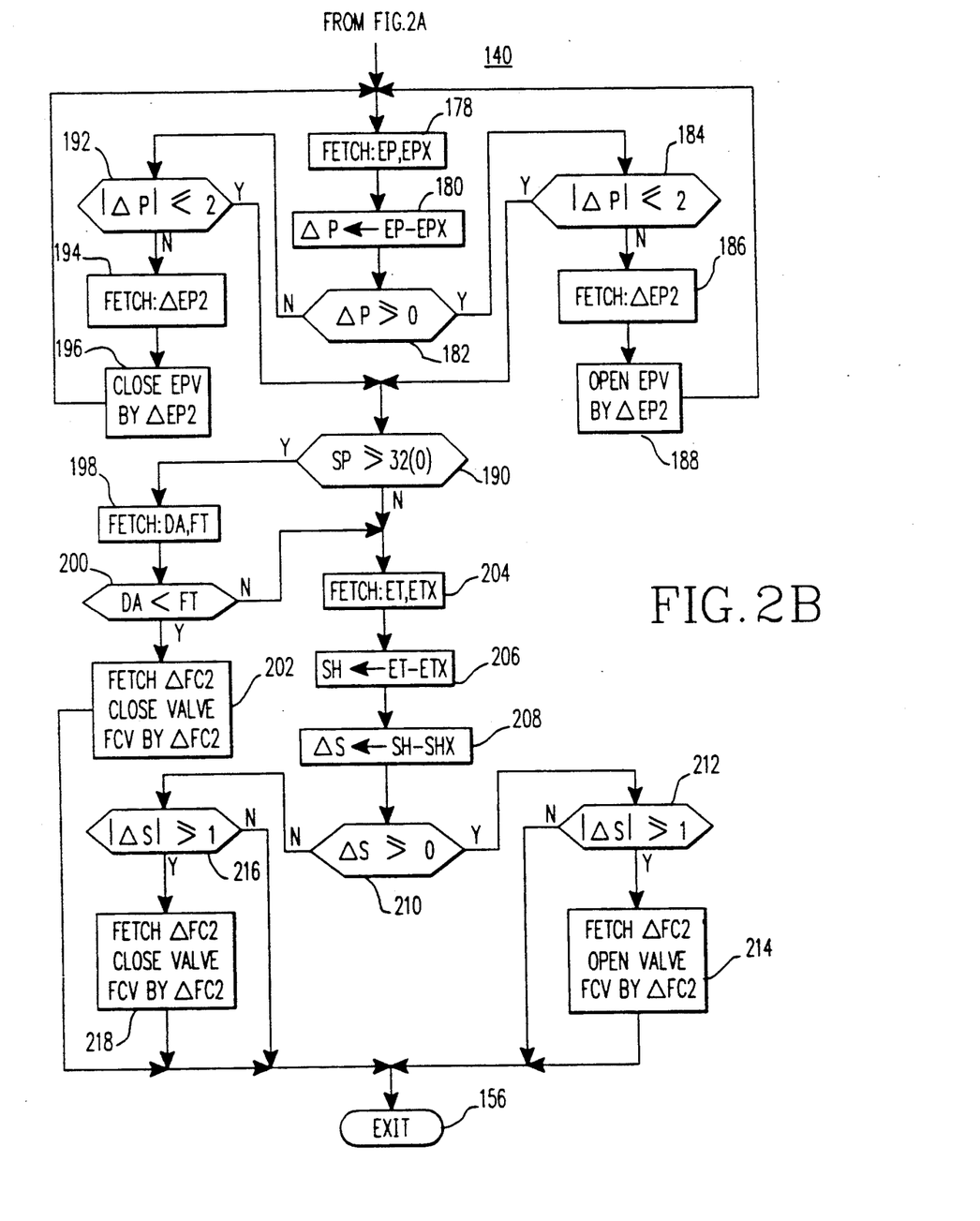

FIGS. 2A and 2B illustrate a flow diagram of a program 140 stored in read-only-memory (ROM) 67 associated with controller 66 for operating refrigeration system 10 according to the teachings of the invention, which teachings include selecting and modulating or controlling the mass flow rate of liquid cryogen 18 from the cryogenic cooling means 15 to heat exchanger 44 in response to predetermined system conditions, and for selecting and controlling the vapor pressure of the cryogen in heat exchanger 44 to, or towards, an optimum evaporation pressure and saturation temperature, according to still further system conditions.

Program 140 is periodically entered at entry point 142 of FIG. 2A and step 144 fetches the set point temperature SP provided by set point selector 68, the temperature RA of the return air 60, which is sensed by return air temperature sensor 74, and the signal DS provided by defrost sensor 72. Step 146 then subtracts the temperature RA of the return air 60 from the set point temperature SP to provide a value $\Delta T$. Step 148 then uses $\Delta T$ to determine whether a cooling cycle is required. As hereinbefore stated, refrigeration system 10 holds the temperature of conditioned space 12 in a narrow temperature band adjacent to the selected set point temperature SP. When $\Delta T$ is negative and outside than a temperature "satisfied" zone adjacent to set point SP, a cooling cycle is required. In like manner, when $\Delta T$ is positive and outside than a temperature "satisfied" zone adjacent to set point SP, a heating cycle is required. When step 148 finds that a cooling cycle is not required, step 148 proceeds to step 150 which terminates flow of liquid cryogen 18 to heat exchanger 44 by closing modulation or flow control valve FCV, and by closing evaporation pressure valve EPV. Step 150 then proceeds to step 152 which determines if a heating cycle is required to hold the temperature of conditioned space 12 in the "satisfied" zone adjacent to the selected set point temperature SP. If a heating cycle is required step 152 proceeds to step 154 which runs a heat cycle subroutine. The present invention is specifically concerned with the cooling cycle, and thus a specific heating cycle subroutine is not shown, The heating cycle subroutine may include, for example, the operation of a heat pipe arrangement such as shown and described in detail in the hereinbefore mentioned application Ser. No. 07/982,543 or, other suitable means and heat cycle control algorithms may be provided for adding heat to heat exchanger means 42, including arrangements which direct cryogen from cryogen cooling means 15 through suitable heating means similar to heating means 106, and then through heat exchanger 44, or a separate heat exchanger, as desired. Such arrangements are shown and described in detail in the hereinbefore mentioned co-pending applications. Step 154 then proceeds to program exit or return 156.

If step 152 finds that a heating cycle is not required to hold set point, neither heating nor cooling is required and refrigeration system 10 is thus in a null cycle. Step 152 proceeds to step 158 to determine if the air mover means 58 should be operated during the null cycle. For example, even though the temperature of conditioned space 12 is in a null temperature band close to the selected set point temperature, the conditioned load in conditioned space 12 may require air circulation, such as a fresh or non-frozen load. Thus, step 158 may simply determine if the set point temperature value SP indicates a frozen, or a non-frozen load, proceeding to step 160 only when the set point value SP indicates a non-frozen load. If air flow is required, step 158 proceeds to step 160 which runs an air flow subroutine. For example, refrigeration system 10 may include a conduit and valving arrangement similar to that shown and described in detail in the hereinbefore mentioned application Ser. No. 07/982,364 which enables operation of air mover means 58 without affecting the temperature of conditioned space 12. If step 158 finds that air flow is not required by the load in conditioned space 12 during a null cycle, step 158 proceeds to program exit 156.

When step 148 finds that a cooling cycle is required, step 148 proceeds to step 162 which determines if a defrost cycle is required to remove water ice from heat exchanger 44. Various means for triggering a defrost cycle have been previously described. If a defrost cycle is required, step 162 proceeds to step 164 which runs a defrost subroutine. A defrost subroutine is similar to a heating cycle, except it includes the step of preventing warm air from being discharged into conditioned space 12, such as by closing a defrost damper, if one is provided, which closes opening 64 in housing 50, or the step of stopping air mover means 58. Step 164 then proceeds to program exit 156.

Figure 3:
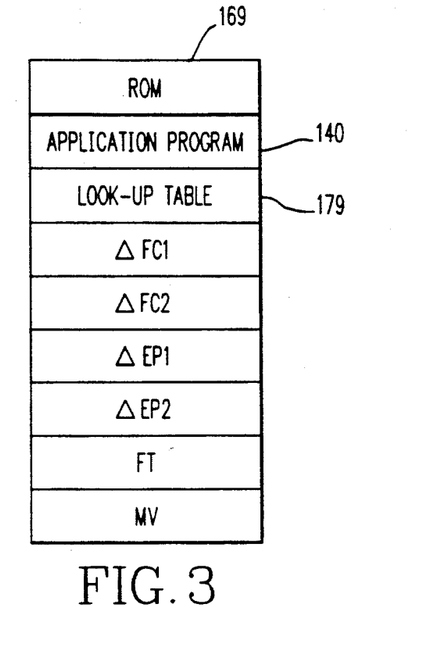
FIG. 3 is a ROM map illustrating certain constants which are stored in a read-only-memory (ROM) shown in FIG. 1 and utilized by the program shown in FIGS. 2A and 2B.
Figure 4:
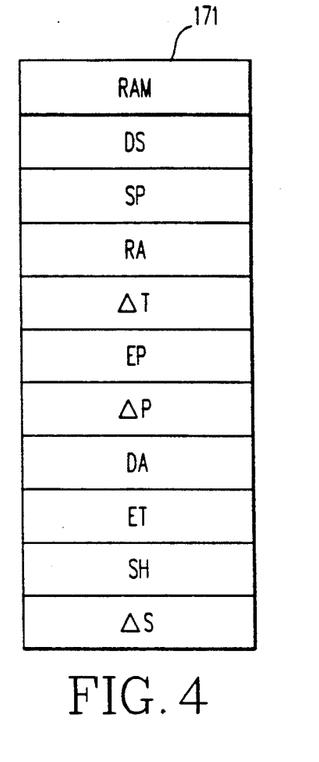
FIG. 4 is a RAM map illustrating certain variables which are stored in a random-access-memory (RAM) shown in FIG. 1 and utilized by the program shown in FIGS. 2A and 2B.

When step 162 finds that a defrost cycle is not required, step 162 proceeds to step 166 which fetches a valve opening increment value $\Delta FC1$ which is stored in ROM 67, as illustrated in a ROM map 169 in FIG. 3. Step 166 then advances to step 168 which opens flow control valve FCV by the increment $\Delta FC1$. Step 170 then obtains the actual vapor pressure EP in heat exchanger 44, which value is periodically obtained from the input ET/EP from pressure and temperature sensor 78 and stored in RAM 69, as illustrated in a RAM map 171 in FIG. 4. Step 170 also retrieves a minimum pressure value MV stored in ROM 67, which indicates a predetermined minimum allowable vapor pressure for heat exchanger 44. When the cryogen utilized is $CO_2$, the minimum pressure value MV will be about 80 psia, just above the triple point of $CO_2$. Step 172 then compares the actual pressure EP with the minimum pressure MV, and if the actual pressure EP is not equal to, or greater than the minimum pressure MV, step 172 returns to step 168 to further open flow control valve FCV. The loop comprising steps 168, 170 and 172 continues until flow control valve FCV has been opened to a point where the evaporation pressure EP satisfies the minimum test of step 172, and then step 172 proceeds to step 174.

Step 174 obtains an incremental valve opening control value $\Delta EP1$ from ROM 67 for use with pressure control value EPV, and step 176 opens the evaporation pressure control value EPV by the incremental value $\Delta EP1$. Step 176 then advances to step 178 in FIG. 2B, to initiate evaporation pressure and flow control arrangements according to the teachings of the invention. For a given refrigeration system arrangement 10 and a desired set point temperature SP for an associated conditioned space 12 there is an optimum evaporation pressure and associated evaporation temperature for the cryogen utilized, which in the exemplary embodiment of the invention is $CO_2$. The optimum evaporation pressure and temperature for $CO_2$ may be calculated by controller 66 from the set point temperature selected on set point selector 68, using calculation steps stored in ROM 67; or, as illustrated generally in the ROM map 169 of FIG. 3, and in detail in FIG. 5, a look-up table 179 may be prepared listing optimum evaporation pressures EPX and associated evaporation temperatures ETX for a plurality of set point temperatures SP, and stored in ROM 67.

Figure 5:
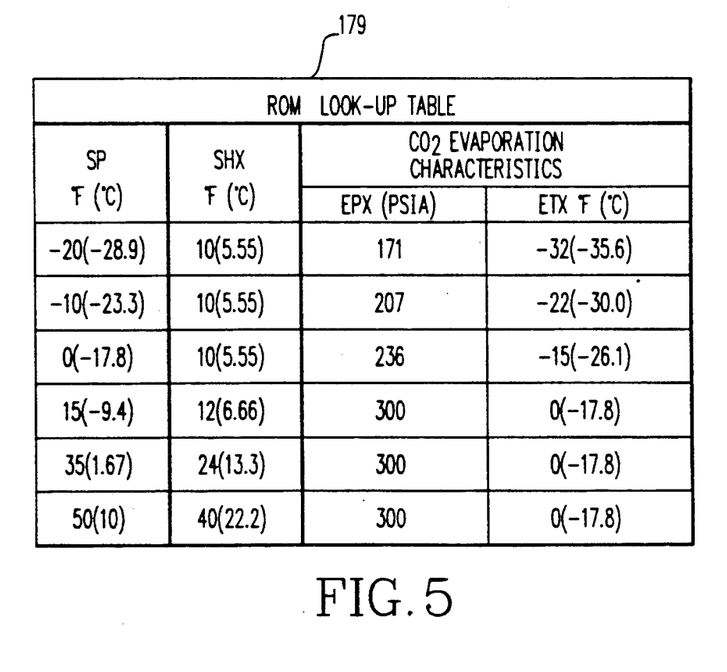
FIG. 5 is an exemplary look-up table which is stored in the ROM shown in FIG. 1, and which is indicated generally in the ROM map of FIG. 3.

FIG. 5 illustrates an exemplary look-up table 179. For example, if conditioned space 12 contains a frozen load, set point selector 68 may be set for $-20°$ F. ($-28.9°$ C.). With such a set point temperature value, refrigeration system 10 may perform best at an evaporation pressure of 171 psia and a corresponding evaporation or saturation temperature of $-32°$ F. ($-35.6°$ C.), as measured by pressure and temperature sensor 78 at the exit end 80 of heat exchanger 44. Continuing with an exemplary embodiment, conditioned space 14 may contain a non-frozen load, with set point selector 70 set for $+35°$ F. ($+1.67°$ C.), for example. With this set point setting, refrigeration system 10 may perform best at an evaporation pressure of 300 psia, the "as-delivered" pressure of the $CO_2$, and a corresponding evaporation or saturation temperature of $0°$ F. ($-17.8°$ C.), as measured by pressure and temperature sensor 78' at the exit 80' of heat exchanger 44'. Thus, controller 66 can control the evaporation pressures in heat exchangers 44 and 44' from any selected value from 300 psia to just above the triple point of $CO_2$, e.g., 80 psia, with corresponding evaporation or saturation temperatures in heat exchangers 44 and 44' from $0°$ F. to $-62°$ F. ($-17.8°$ C. to $-52.2°$ C.). In other words, the evaporation temperatures in heat exchangers 44 and 44' are each dynamically controllable by controller 66 to select the most appropriate evaporation temperature for the set point temperature SP of their associated conditioned spaces 12 and 14. While the pressures and temperatures in the examples are stated as discrete values, it is to be understood that there may be a predetermined tolerance band around the values, and that the temperatures and pressures may be chose as a continuum of values, ie., a series or connected set of at least two values.

Returning now to FIG. 2B, step 178 obtains the actual evaporation pressure EP, as sensed by sensor 78 and periodically stored in RAM 69, and the optimum evaporation pressure EPX from look-up table 179 for the selected set point temperature SP. Step 180 calculates a difference value $\Delta P$ by subtracting the desired evaporation pressure EPX from the actual evaporation pressure EP, preserving the algebraic sign. Step 182 then determines if the difference value $\Delta P$ is equal to or greater than 0. If $\Delta P$ to, or greater than 0, step 182 proceeds to step 184 which determines if the actual pressure EP is within an acceptable tolerance band from the desired pressure EPX, such as by comparing the absolute value of $\Delta P$ with a tolerance value, such as 2, for example. If the absolute value of $\Delta P$ is greater than 2, step 184 advances to step 186 which obtains an incremental pressure change $\Delta EP2$ for valve EPV, which value is stored in ROM 67. Value $\Delta EP2$ may be less than value $\Delta EP1$, for example, as value $\Delta EP1$ is used as an initial opening setting for valve EPV, while value $\Delta EP2$ is used in fine tuning a desired operational setting of evaporation pressure control valve EPV. Since step 182 found the actual evaporation pressure EP exceeded the desired evaporation pressure EPX, step 188 opens valve EPV by the incremental value $\Delta EP2$, and step 188 returns to step 178. The loop comprising steps 178, 180, 182, 184, 186 and 188 is repeated until step 184 finds the actual pressure EP is within the acceptable tolerance of the desired pressure EPX, at which point the loop is broken and step 184 advances to step 190 in the next portion of program 140.

If step 182 finds that $\Delta P$ is not equal to, or greater than 0, step 182 proceeds to step 192 which determines if the actual pressure EP, while less than the desired pressure EPX, is within an acceptable tolerance band from the desired pressure EPX, by comparing the absolute value of ΔP with a tolerance value, such as the value of 2 used in step 184. If the absolute value of ΔP is greater than 2, step 192 advances to step 194 which obtains the incremental pressure change value ΔEP2 for valve EPV stored in ROM 67. Since step 182 found the actual evaporation pressure EP is less than the desired evaporation pressure EPX, valve EPV is closed in step 196 by the incremental value ΔEP2, and step 196 returns to step 178. The loop comprising steps 178, 180, 182, 192, 194 and 196 is repeated until step 192 finds the actual pressure EP is within the acceptable tolerance of the desired pressure EPX, at which point the loop is broken and step 192 advances to step 190.

Step 190 determines if the set point SP is set to condition a fresh or a frozen load, such as by comparing the set point temperature SP with +32° F. (0° C.). If the set point temperature SP is above the freezing point, it is important to control the temperature of the discharge air DA so that it doesn't fall below a predetermined floor temperature FT to prevent spot freezing of the conditioned load. Thus, when step 190 finds that a non-frozen load is being conditioned in conditioned space 12, step 190 proceeds to step 198 which fetches the temperature DA of conditioned air 62 being discharged into conditioned space 12 via air mover means 58, with the temperature DA of conditioned air 62 being sensed by discharge air sensor 76. Step 198 also fetches a floor temperature value FT, which is stored in ROM 67. Step 200 then determines if the temperature DA of the discharge air 62 is less than the predetermined floor value FT. If DA is less than the floor value FT, step 200 proceeds to step 202 which fetches an incremental flow control valve control value ΔFC2 from ROM 67. Value ΔFC2 may be less than value ΔFC1, for example, as value ΔFC1 is used as an initial opening setting for valve FCV, and as a quick adjustment to get the evaporation pressure above the minimum value MV, while value ΔFC2 is used in fine tuning the setting of flow control valve FCV. Step 202 then closes valve FCV by the incremental value ΔFC2, and the program exits at 156. Each time program 140 is run, program 140 will stay in the loop comprising steps 190, 198, 200, and 202, until step 200 finds that the discharge air temperature DA is not less than the floor temperature FT, at which point the loop is broken by step 200 branching to step 204.

When step 190 finds that the load in conditioned space 12 is not a fresh load, step 190 proceeds immediately to step 204. Step 204 initiates a portion of program 140 which adjusts flow control valve FCV to efficiently match the use of cryogen to that required by the conditioned load in conditioned space 12 at any instant. Step 204 fetches the actual temperature ET of the vaporized cryogen exiting heat exchanger 44, as measured by pressure and temperature sensor 78 and periodically stored in RAM 69, and the evaporation temperature ETX of the cryogen is obtained from look-up table 179 stored in ROM 67. Step 206 compares the temperature ET of the vapor exiting heat exchanger 44 with the evaporation temperature ETX of the cryogen in heat exchanger 44, to determine if the vapor is superheated, and if so, the degree of superheat in the exiting vapor, by subtracting ETX from ET to obtain a superheat value SH. Step 208 obtains a desired degree of superheat SHX for the set point setting SP, which is obtained from look-up table 179. Step 208 further compares the actual degree of superheat SH with the desired degree of superheat SHX, with SHX being 10° F. (5.55° C.), for a frozen load, and 24° F. (13.3° C.) for a non-frozen load, for example.

More specifically, step 208 subtracts the desired superheat SHX from the actual superheat SH to obtain a difference value ΔS, preserving the algebraic sign. Step 210 determines if the difference value ΔS is equal to, or greater than, 0. If ΔS exceeds 0, the actual superheat SH exceeds the desired superheat SHX, and step 212 determines if the absolute value of ΔS is within a predetermined tolerance value, such as 1. If ΔS is not within the specified allowable tolerance, step 212 advances to step 214 which fetches the incremental value ΔFC2 from ROM 67 and step 214 then opens the flow control valve FCV by this incremental value to reduce the actual degree of superheat. Program 140 then exits at 156. The loop comprising steps 210, 212 and 214 then continues on each running of program 140 until step 212 finds that the actual superheat value SH has dropped to within the allowable tolerance range of the desired superheat value SHX, at which point step 212 by-passes step 214, advancing directly to program exit 156.

If step 210 finds that ΔS is less than 0, the actual superheat value SH is less than the desired super heat value SHX, and step 210 branches to step 216 which determines if the absolute value of ΔS is within a predetermined tolerance value, such as the value of 1 used in step 212. If ΔS is not within the allowable tolerance, step 216 advances to step 218 which fetches the incremental value ΔFC2 from ROM 67. Step 218 then closes the flow control value FCV by this incremental value to increase the actual degree of superheat, and the program exits at 156. The loop comprising steps 210, 216 and 218 then continues on each running of program 140 until step 216 finds that the actual superheat SH value has increased to within the allowable tolerance range of the desired superheat value SHX, at which point step 216 by-passes step 218, advancing directly to program exit 156.

It will be noted in FIG. 2B that the adjustment of flow control valve FCV as a function of the temperature DA of the discharge air 62 via steps 198, 200, and 202 overrides the adjustment of flow control valve FCV as a function of superheat in steps 204 through 218, when set point temperature indicates a non-frozen load is being in conditioned space 12. Until the temperature DA of the discharge air 62 exceeds the floor temperature FT, program 140 does not consider the program steps which control valve FCV as a function of superheat.

While incremental values ΔFC1, ΔFC2, ΔEP1 and ΔEP2 have been described as being fixed values, it is to be understood that they may be dynamic, calculated values, such as being proportional to one or more predetermined system operating conditions, such as ΔT, ΔP, or Δ(EP-MV).

Further, it is to be understood that conventional refrigeration techniques may be used to prevent over shooting the set point temperature SP, such as during initial temperature pull-down of a conditioned space. During initial temperature pull-down the system may be caused to operate at high superheat values, with an "anticipation" algorithm being used to reduce mass flow and superheat before set point SP is reached.

While not illustrated in the Figures, in order to prevent excessive pressures from building up when refrigeration system 10 is shut down, a pressure relief valve should be added at any location where liquid cryogen may be trapped between two valves at shut down, such as between valves 86 and 131. Also, an expansion orifice, or expansion orifices, may be located at a selected location, or locations, in the cryogen flow paths, depending upon the diameter of the tubing used, system pressure drops, and the like. In lieu of an expansion orifice, it would also be suitable to use one or more vapor motors, or expansion valves, to provide the desired expansion.

We claim:

1. A method of operating a refrigeration system having cryogenic cooling means in a liquid state and heat exchanger means, for controlling the temperature of a conditioned space to a predetermined temperature range adjacent to a selected set point temperature via at least a cooling cycle, with the cooling cycle comprising the steps of:

providing a desired evaporation vapor pressure value of the cryogen as a function of the selected set point temperature, controlling the evaporation pressure in the heat exchanger means as a function of the desired evaporation vapor pressure value, providing a desired superheat value of the cryogen exiting the heat exchanger means as a function of the selected set point temperature.

and controlling the mass flow a rate of liquid cryogen from the cryogenic cooling means to the heat exchanger means as a function of the desired superheat value.

2. The method of claim 1 wherein the step of controlling the evaporation pressure in the heat exchanger means as a function of the desired evaporation pressure value includes the steps of:

determining the actual evaporation vapor pressure of the cryogen.

providing a pressure difference value responsive to the difference between the actual and desired evaporation pressures, and controlling the evaporation pressure in the heat exchanger means as a function of the pressure difference value.

3. The method of claim 1 wherein the step of controlling the mass flow rate of liquid cryogen from the cryogenic cooling means to the heat exchanger means as a function of the desired superheat value includes the steps of:

determining the actual superheat in the cryogen exiting the heat exchanger means, providing a superheat difference value responsive to the difference between the actual and desired superheat values, and controlling the mass flow rate of liquid cryogen from the cryogenic cooling means to the heat exchanger means as a function of the superheat difference value.

4. The method of claim 1 including the steps of:

drawing air from the conditioned space, moving the air in heat exchange relation with the heat exchanger means, discharging conditioned air into the conditioned space, sensing the temperature of the discharge conditioned air, providing a minimum temperature value for the discharged conditioned air, and controlling the mass flow rate of liquid cryogen from the cryogenic cooling means to the heat exchanger means to prevent the temperature of the discharged conditioned air from falling below the minimum temperature value.

5. The method of claim 4 wherein the step of controlling the mass flow rate to prevent the temperature of the discharged conditioned air from falling below the minimum temperature value includes the step of decreasing the mass flow rate to prevent the temperature of the discharged conditioned air from falling below the minimum temperature value.

6. The method of claim 5 wherein the step of decreasing the mass flow rate to prevent the temperature of the discharged conditioned air from falling below the predetermined minimum temperature value occurs prior to the step of controlling the mass flow rate of liquid cryogen from the cryogenic cooling means to the heat exchanger means as a function of the desired superheat value.

7. A method of operating a refrigeration system having cryogenic cooling means in a liquid state and heat exchanger means, for controlling the temperature of a conditioned space to a predetermined temperature range adjacent to a selected set point temperature via at least a cooling cycle, with the cooling cycle comprising the steps of:

providing a desired evaporation vapor pressure value of the cryogen as a function of the selected set point temperature, controlling the evaporation pressure in the heat exchanger means as a function of the desired evaporation vapor pressure value, drawing air from the conditioned space, moving the air in heat exchange relation with the heat exchanger means, discharging conditioned air into the conditioned space, sensing the temperature of the discharged conditioned air, providing a minimum temperature value for the discharged conditioned air, and controlling the mass flow rate of liquid cryogen from the cryogenic cooling means to the heat exchanger means to prevent the temperature of the discharged conditioned air from falling below the minimum temperature value.

8. The method of claim 7 wherein the step of controlling the mass flow rate to prevent the temperature of the discharged conditioned air from falling below the minimum temperature value includes the step of decreasing the mass flow rate to prevent the temperature of the discharged conditioned air from falling below the minimum temperature value.

9. The method of claim 8 including the steps of: providing a desired superheat value of the cryogen exiting the heat exchanger means as a function of the selected set point temperature, and, after the step of controlling the mass flow rate to prevent the temperature of the discharged conditioned air from falling below the minimum temperature value, the step of controlling the mass flow rate of liquid cryogen from the cryogenic cooling means to the heat exchanger means as a function of the desired superheat value.

10. A refrigeration system having cryogenic cooling means in a liquid state and heat exchanger means, which controls the temperature of a conditioned space to a predetermined temperature range adjacent to a selected set point temperature via at least a cooling cycle, the improvement comprising:

means providing a desired evaporation vapor pressure value of the cryogen as a function of the selected set point temperature, means controlling the evaporation pressure in the heat exchanger means as a function of the desired evaporation vapor pressure value, means providing a desired superheat value of the cryogen exiting the heat exchanger means as a function of the selected set point temperature, and means controlling the mass flow rate of liquid cryogen from the cryogenic cooling means to the heat exchanger means as a function of the desired superheat value.

11. The refrigeration system of claim 10 wherein the means controlling the evaporation pressure in the heat exchanger means as a function of the desired evaporation pressure value includes:

means determining the actual evaporation vapor pressure of the cryogen, means providing a pressure difference value responsive to the difference between the actual and desired evaporation pressures, and means controlling the evaporation pressure in the heat exchanger means as a function of the pressure difference value.

12. The refrigeration system of claim 10 wherein the means controlling the mass flow rate of liquid cryogen from the cryogenic cooling means to the heat exchanger means as a function of the desired superheat value includes:

means determining the actual superheat in the cryogen exiting the heat exchanger means;

means providing a superheat difference value responsive to the difference between the actual and desired superheat values, and means controlling the mass flow rate of liquid cryogen from the cryogenic cooling means to the heat exchanger means as a function of the superheat difference value.

13. The refrigeration system of claim 10 including:

means for drawing air from the conditioned space, moving the air in heat exchange relation with the heat exchanger means, and discharging conditioned air into the conditioned space, means sensing the temperature of the discharged conditioned air, means providing a minimum temperature value for the discharged conditioned air, and means controlling the mass flow rate of liquid cryogen from the cryogenic cooling means to the heat exchanger means to prevent the temperature of the discharged conditioned air from falling below the minimum temperature value.

14. The refrigeration system of claim 13 wherein the means controlling the mass flow rate to prevent the temperature of the discharged conditioned air from falling below the minimum temperature value includes means for decreasing the mass flow rate to prevent the temperature of the discharged conditioned air from falling below the minimum temperature value.

15. The refrigeration system of claim 14 wherein the means for preventing the temperature of the discharged conditioned air from falling below the minimum temperature value overrides the means which controls the mass flow rate of liquid cryogen from the cryogenic cooling means to the heat exchanger means as a function of the desired superheat value.

16. A refrigeration system having cryogenic cooling means in a liquid state and heat exchanger means, which controls the temperature of a conditioned space to a predetermined temperature range adjacent to a selected set point temperature via at least a cooling cycle, the improvement comprising:

means providing a desired evaporation vapor pressure value of the cryogen as a function of the selected set point temperature, means controlling the evaporation pressure in the heat exchanger means as a function of the desired evaporation vapor pressure value, means for drawing air from the conditioned space, moving the air in heat exchange relation with the heat exchanger means, and discharging conditioned air into the conditioned space, means sensing the temperature of the discharged conditioned air, means providing a minimum temperature value for the discharged conditioned air, and means controlling the mass flow rate of liquid cryogen from the cryogenic cooling means to the heat exchanger means to prevent the temperature of the discharged conditioned air from falling below the minimum temperature value.

17. The refrigeration system of claim 16 wherein the means for controlling the mass flow rate to prevent the temperature of the discharged conditioned air from falling below the minimum temperature value includes means for decreasing the mass flow rate to prevent the temperature of the discharged conditioned air from falling below a predetermined floor value.

18. The refrigeration system of claim 17 including:

means providing a desired superheat value of the cryogen exiting the heat exchanger means as a function of the selected set point temperature SP, and, wherein the means for controlling the mass flow rate to prevent the temperature of the discharged conditioned air from falling below the minimum temperature value, additionally includes means for controlling the mass flow rate of liquid cryogen from the cryogenic cooling means to the heat exchanger means as a function of the desired superheat value.

* * * * *